United States Patent [19]

Rynearson

[11] 4,060,837

[45] Nov. 29, 1977

[54] VARIABLE CELL WIDTH RECORDING

[75] Inventor: John L. Rynearson, Oakdale, Minn.

[73] Assignee: Minnesota Mining and Manufacturing Company, St. Paul, Minn.

[21] Appl. No.: 680,055

[22] Filed: Apr. 26, 1976

[51] Int. Cl.$^2$ ............................................. G11B 5/02
[52] U.S. Cl. .................................................... 360/44
[58] Field of Search ..................... 360/44, 51, 40, 43

[56] References Cited

U.S. PATENT DOCUMENTS

| | | | |
|---|---|---|---|
| 3,237,176 | 2/1966 | Jenkins | 360/43 |
| 3,281,806 | 10/1966 | Lawrance et al. | 360/44 |
| 3,720,927 | 3/1973 | Wolf | 360/44 |

Primary Examiner—Vincent P. Canney

Attorney, Agent, or Firm—Cruzan Alexander; Donald M. Sell; Robert E. Granrud

[57] ABSTRACT

Binary numbers are recorded on a track of a medium in the form of signals of first and second voltage levels, respectively indicating alternate timing signals of uniform time duration $t$ and data signals of variable time duration $x$. A timing signal is followed by a short data signal to indicate binary zero, by a longer data signal to indicate binary one, and by even longer data signals to indicate the absence of binary data. The signals may be decoded by counting up from zero during each timing signal and down during each data signal such that a positive count-down indicates a binary zero, a relatively small negative count-down indicates a binary one, and a relatively large negative count-down indicates absence of binary data.

15 Claims, 6 Drawing Figures

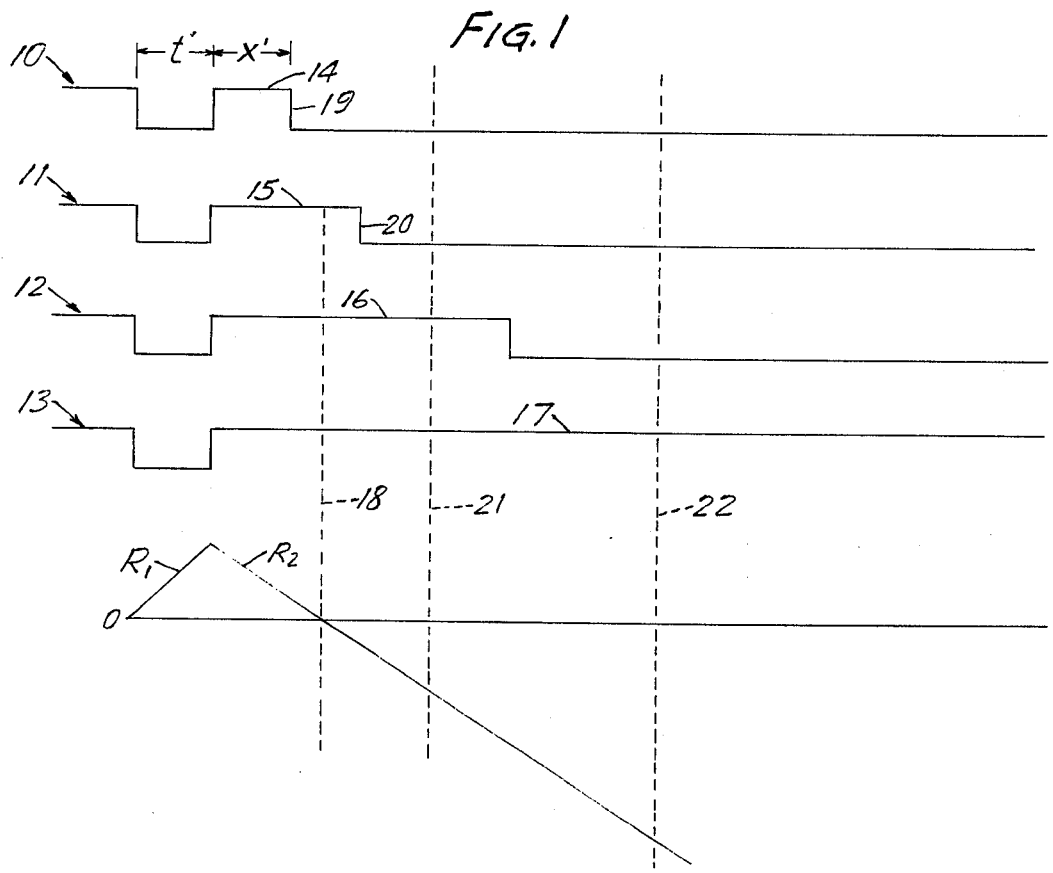

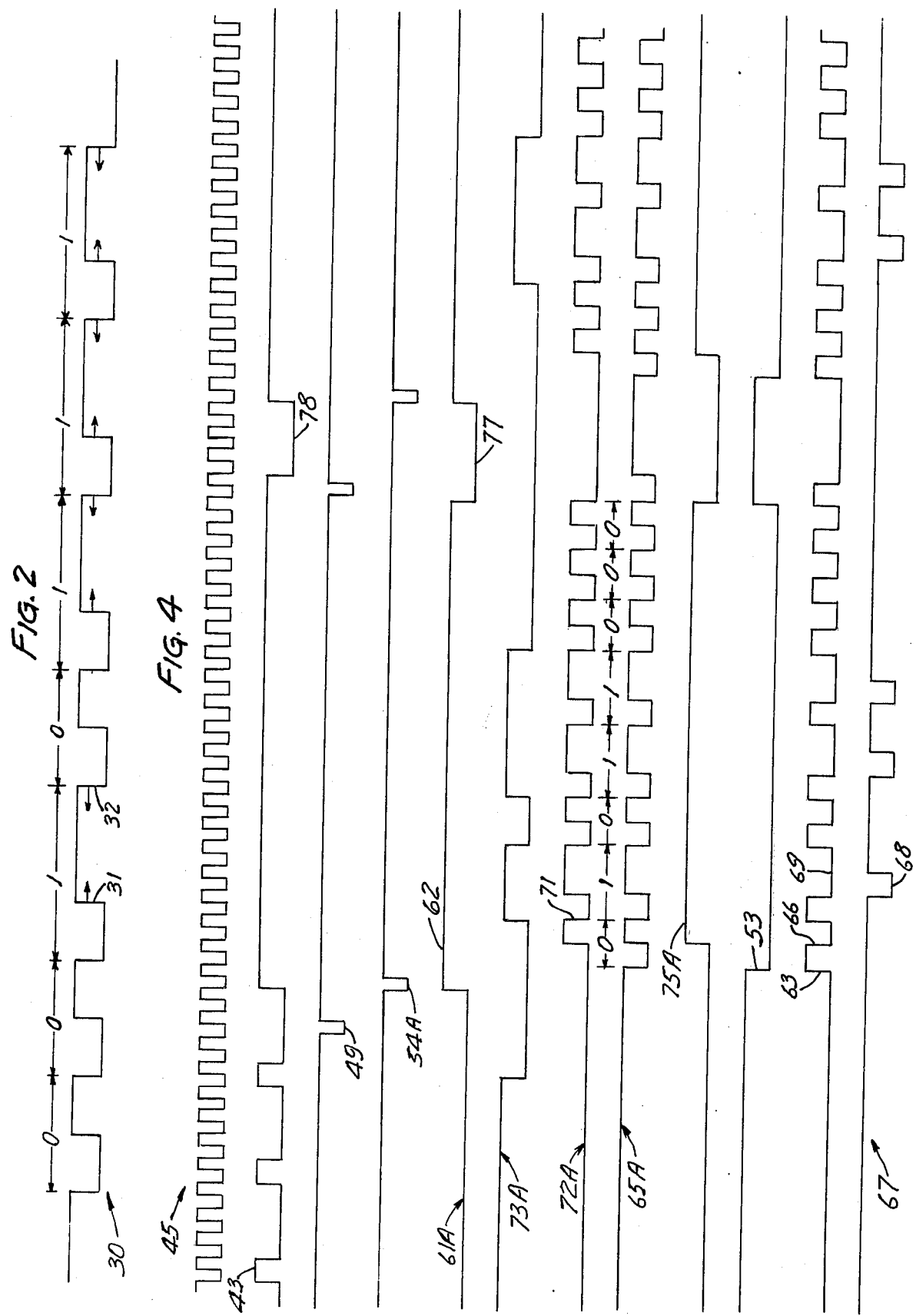

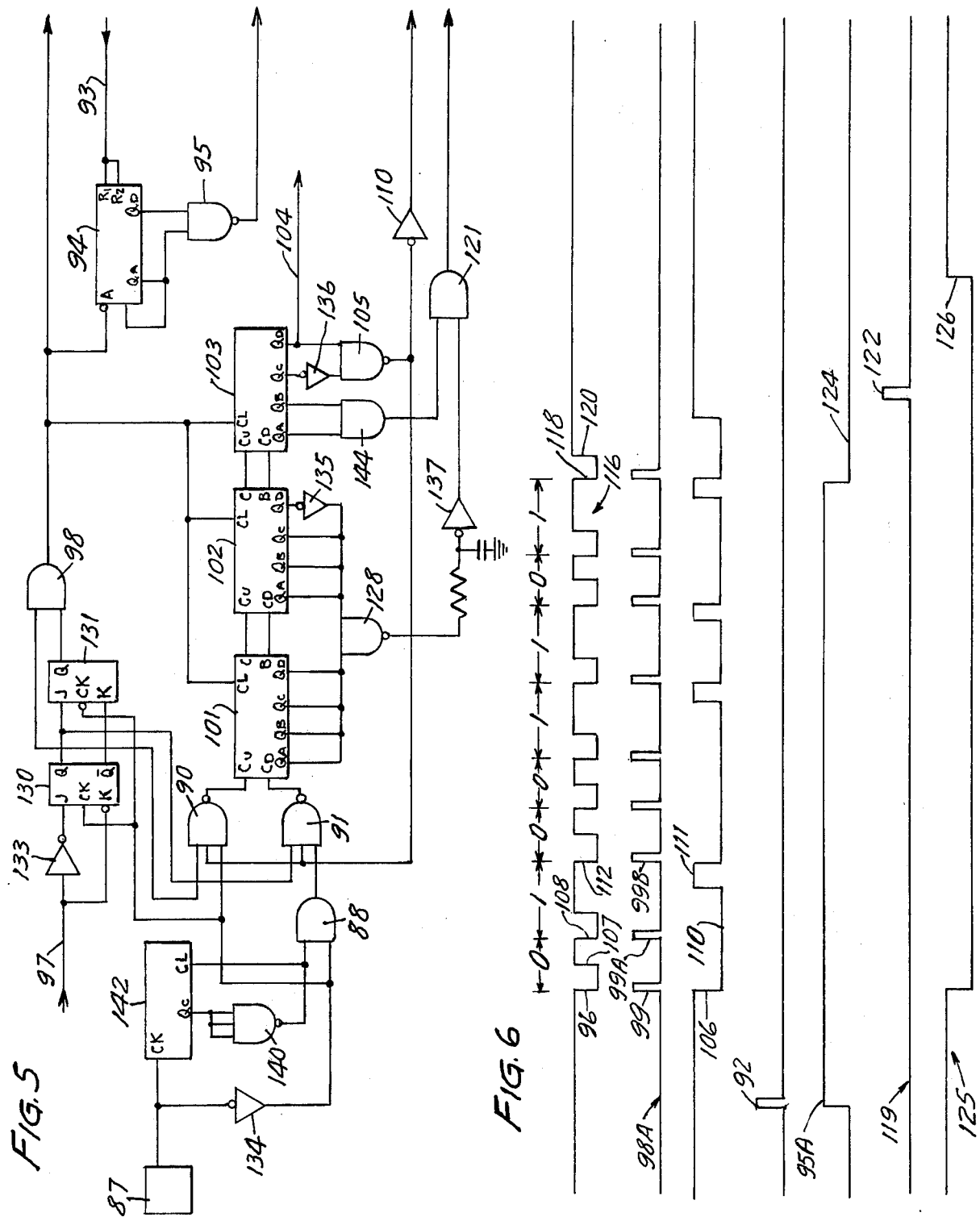

VARIABLE CELL WIDTH RECORDING

FIELD OF THE INVENTION

This invention relates to the encoding and decoding of binary numbers, and particularly to magnetic recording and playback of binary numbers on magnetic recording tape.

BACKGROUND OF THE INVENTION

Most phase encoding systems for magnetic recording are fairly intolerant of variations in head-to-medium speed. Because of the high cost of the sophisticated equipment for assuring constant speed, a great deal of effort has been expended toward developing encoding systems which are less sensitive to speed changes. Most such systems employ two tracks and hence require dual electronics.

U.S. Pat. No. 3,720,927 (Wolf) concerns a time-ratio encoding system which requires only one track of the recording medium and yet is quite insensitive to speed changes. Binary 1's and 0's are recorded sequentially along the track, each bit having a constant time period represented by a first voltage level during the initial part of the time period and a second voltage level for the remaining part of the time period. To represent a 1, the first voltage level is maintained for more than one-half of the time period; to represent a 0, the first voltage level is maintained for less than one-half of the time period. The data is decoded by counting up until a transition from the first to second voltage level and then counting down at the same rate until the next transition to the first voltage level. A positive count indicates a 1 and a negative count indicates a 0.

THE PRESENT INVENTION

Like the Wolf patent, the present invention provides a system for encoding a recording medium which requires only one track and yet is insensitive to moderate variations in the head-to-medium speed. Unlike the binary cells of Wolf, the 1's and 0's of the present invention differ in width. Hence, encoded messages of equal numbers of characters may have various lengths, thus complicating the changing of a portion of the characters. If selective overwrite capability is desired, sufficient track length must be reserved for the longest possible message, in which case the same number of bits of information can be recorded per unit length of medium as in the Wolf system, assuming the same minimum time between transitions. On the other hand, if selective overwrite is unnecessary, the present invention permits approximately 20 percent increase in bit density as compared to Wolf. Because transition shifts due to pulse crowding can have an adverse effect upon reliable decoding in only one of the binary states, as opposed to both binary states in Wolf's system, the present invention permits fine tuning to minimize the possibility of error.

In the present invention, alternate timing and data signals of first and second voltage levels, respectively, are serially recorded along a track of a recording medium, independently of other tracks. Each timing signal has a predetermined time duration $t$ and the data signals have variable time durations $x$. A first binary number is designated by $x = at$, a second binary number is designated by $x = abt$ and the absence of binary information is designated by $x > abct$, where $a$ is a predetermined small number and each of $b$ and $c$ is a predetermined number appreciably exceeding 1. Generally $a$ should be between ½ and 2, $b$ between 1.5 and 3, and $c$ between 1.25 and 3. For the signals to be as compact as possible, $a$ should be about one, since adverse effects of pulse crowding are minimized when the time duration of the shortest data signal approximately equals that of the timing signal. When $a$ is about one, $b$ is preferably about 2, thus permitting the signals to be compact and the two binary numbers to be easily distinguished from each other.

Decoding messages of the present invention involves the steps of:

a. serially playing back the recorded signals, b. measuring the time interval $t'$ of a played-back signal at a rate $R_1$, where $t'$ differs from $t$ as the head-to-medium speeds differ in recording and playback, c. measuring the time interval $x'$ of the succeeding played-back data signal at a rate $R_2 = rR_1$, where $x'$ differs from $x$ as the head-to-medium speeds differ in recording and playback and $r$ should be between 0.1 and 5, and d. subtracting the $x'$ measurement from the $t'$ measurement and producing an output signal indicative of the first binary number when the difference is greater than a first quantity $t - rn$ where $n$ is a value intermediate $at$ and $abt$, indicative of the second binary number when the difference is less than said first quantity and is greater than a second quantity $t - r(abct)$, indicative of the absence of binary information when the difference is less than said second quantity.

Even though the two binary numbers are distinguished from each other by a fixed value, there is little likelihood of error due to variations between recording and playback speeds, since the effect of any such variation tends to be cancelled in the subtracting step (d). On the other hand, there is no such cancelling effect in distinguishing the second binary number from the absence of data. Hence, the value of $c$ should be selected to provide adequate allowance for descreased head-to-medium speed on playback or increased head-to-medium speed on recording. Preferably $c$ has the smallest value that provides such allowance, e.g., 1.5.

Typically, binary numbers are grouped into bytes, and the bytes are in turn grouped into blocks, in which case it is desirable to distinguish between an inter-byte gap and the end of a message consisting of a block of bytes. An inter-byte gap is represented by generating a timing signal followed by a data signal having a predetermined time duration exceeding $abct$. An inter-block gap is represented by a timing signal followed by a data signal having a predetermined time duration exceeding $abcdt$ where $d$ is a predetermined number appreciably exceeding 1, preferably 1.5 to 8.

Upon decoding the signals, an inter-byte gap is indicated when the difference $t' - x'$ is less than $t - r(abct)$. If the difference also is less than $t - r(abcdt)$, an inter-block gap or end-of-message is indicated.

THE DRAWING

Referring now to the drawing:

FIG. 1 shows playback waveforms and their decoding in the practice of the invention;

FIG. 2 shows a waveform illustrative of the playback of a series of binary numbers;

FIG. 3 is a block diagram of a preferred encoding circuit of the present invention;

FIG. 4 is a timing diagram showing the encoding of the byte 0-1-0-1-1-0-0-0 by the circuit of FIG. 3;

FIG. 5 is a block diagram of a preferred decoding circuit of the present invention; and FIG. 6 is a timing diagram showing the decoding of the byte 0-1-0-0-1-1-0-1 by the circuit of FIG. 5.

FIG. 1 shows playback waveforms 10, 11, 12 and 13 which respectively indicate binary 0, binary 1, inter-byte gap and end-of-message. The waveforms are scaled to preferred values: $a = 1$, $b = 2$, $c = 1.5$ and $d = 2$. Each includes a timing signal of duration $t'$ at one voltage level followed by a data signal of duration $x'$ at a different voltage level. For the binary 0, the data signal 14 approximately equals $t'$ since $a = 1$. For the binary 1, the data signal 15 approximately equals $2t'$. For the inter-byte gap, the data signal 16 approximately equals $4t'$ and thus appreciably exceeds $abct = 3t$, assuming no undue difference between $t$ and $t'$. Since the data signal 17 of the waveform 13 extends beyond $abcdt = 6t$, it indicates an inter-block gap or end-of-message.

Decoding of the waveforms of FIG. 1 is conveniently carried out by counting up from zero during the interval $t'$ at a uniform rate $R_1$ and then counting down during the interval $x'$ at a uniform rate $R_2$ which is less than $R_1$. The first binary number (0) is indicated when the count-down is positive. The second binary number (1) is indicated when the count-down is negative and has an absolute magnitude less than a pre-selected value. A negative count-down reaching an absolute magnitude greater than said pre-selected value indicates the absence of data, i.e., an inter-byte or inter-block gap. Of course, the counting can first be down and then up. As an alternative to counting, the intervals $t'$ and $x'$ may be measured by an analog device, e.g., charging a capacitor through differing resistors to provide differing rates $R_1$ and $R_2$.

In specific apparatus for decoding the waveforms of FIG. 1, a digital counter may be employed with $R_1$ adjusted to reach 128 when time $t'$ equals $t$, and $R_2$ adjusted to return to zero when time $x'$ is 1.5$t'$, as indicated by the vertical dashed line 18. Assuming no variations in head-to-medium speed, the count-down may reach plus 42 at the transition 19 marking the end of the binary 0 and minus 42 at the transition 20 marking the end of the binary 1. An inter-byte gap may be indicated as soon as the count reaches minus 128 (dashed line 21) and an inter-block gap indicated as soon as the count reaches minus 512 (dashed line 22).

Assuming that $t'$ may vary 10 percent from $t$, the count-up may vary from about 115 to 141, and the count-down may vary from 20 to 64 at the transition 19 ending a data signal signifying binary 0, or from minus 12 to minus 62 at the transition 20 ending a data signal signifying binary 1. The decoding can be tuned by adjusting the count-down rate $R_2$ relative to $R_1$ or by adjusting the decision points (dashed lines 18, 21 and 22).

Because transition shifts due to pulse crowding have a far greater effect on binary 1's than on binary 0's, the decoding is preferably tuned to move the decision point between a binary 0 and a binary 1 as explained in connection with FIG. 2 of the drawing which shows a waveform 30 indicating 0-0-1-0-1-1-1. Due to pulse crowding, transitions between signals of unequal lengths tend to shift in directions toward equalizing the lengths as indicated in FIG. 2 by arrows. For example, the transition 31 tends to shift to the right and the transition 32 tend to shift to the left. Hence, a zero following a 1 tends to have a lengthened timing pulse $t'$, thus better differentiating the 0 from a 1. A 1 following a 0 tends to increase $t'$ and to reduce $x'$. A 1 following a 1 tends to further increase $t'$ while reducing $x'$, thus tending to make the 1 look more like a 0. For further assurance against error, it is desirable to tune the frequency $R_2$ to bring it closer to the frequency $R_1$.

DESCRIPTION OF THE PREFERRED EMBODIMENT

Referring to the encoding circuit of FIG. 3 and timing diagram of FIG. 4, a counter 38 in its free running state has a high output on a line 39 to a flip-flop 41 which in combination with a flip-flop 42 produces a high level 43 (FIG. 4) from a gate 44 every four negative transitions of a clock pulse 45 on a line 46. The leading edge of this high level 43 causes a short pulse to occur out of a gate 47. Because the output of a flip-flop 48 is low, this pulse will not have an effect on a gate 54. When a "start byte" pulse 49 (FIG. 4) occurs on line 50, a flip-flop consisting of gates 51 and 52 will be set high causing the output of the flip-flop 48 to go high and enabling the pulse from the gate 47 through the gate 54 as indicated at 54A (FIG. 4). This pulse causes the flip-flop consisting of gates 51 and 52 to be cleared and also clears the counter 38. The output of the counter goes low at 53 (FIG. 4), causing the encoding process to start.

The encoding process is carried out by gates 55 and 56, and an inverter 57 and flip-flops 58 and 60. The complement output (61A of FIG. 4) from the counter 38 on a line 61, called "byte-done," is applied to the gates 55 and 56. When "byte-done" goes high at 62 (FIG. 4), the output of the inverter 57 goes high and the output of the flip-flop 60 goes high at 63 on the next negative clock transition. This low-to-high transition of the flip-flop 60 appearing on a line 65 is the start of the encoded data (65A in FIG. 4) from an inverter 70. On the next negative clock transition, the flip-flop 60 output will go low again at 66 (FIG. 4). This low-to-high-to-low pulse from the flip-flop 60 is the timing pulse for the first bit cell. On the next negative clock transition, the flip-flop 60 will go high if a binary zero is to be written or it will stay low if a binary one is to be written. If a binary zero is to be written, the output 67 of the flip-flop 58 will have stayed high on the previous negative clock transition as shown in FIG. 4. If a binary one is to be written, the output of the flip-flop 58 will have gone low at 68 (FIG. 4) on the previous negative clock transition. Since the flip-flop 58 was low, the flip-flop 60 will stay low at 69 for one extra clock transition, thus causing the data pulse for a binary one to be twice as long as for a binary zero. The high-to-low transitions at 71 (FIG. 4) at the output 72A of an inverter 72 is used to indicate when the next bit should be put on a serial data line 73 (73A in FIG. 4). Since it is assumed that the first bit is on the serial data line 73 when the "start-byte" pulse is given on the line 50, flip-flops 74 and 75 block out the first data clock transition. When the output from the flip-flop 75 goes high as indicated at 75A, a gate 76 is enabled. As each bit is encoded, the output from the gate 76 increments the counter 38. The output from the counter 38 will go high on the eighth such increment (there being eight bits in a byte). This causes the "byte-done" output on the line 61 to go low at 77 and disables the encoding flip-flops 58 and 60. The "byte-done" output 61A going low at 77 also causes the flip-flops 41 and 42 to start counting again, causing the output of the gate 44 to go low at 78 (FIG. 4). This action causes the inter-byte gap signal to be inserted. The occurrence of another "start-byte" pulse on the line 50 will cause another byte to be encoded.

The circuit of FIG. 3 has been successfully operated with the following components:

|  | Integrated Circuit TTL Logic No. |
|---|---|
| Counter 38 | 7493 |
| Flip-flops 41, 42, 48, 58, 60, 74, 75 | 74107 |
| Gates 44, 47, 56 | 7408 |
| Gates 51, 52, 76, 54 | 7400 |
| Gate 55 | 7410 |
| Inverters 57, 70, 72, 81, 82, 83 | 7404 |

The circuit of FIG. 5 which decodes information recorded by the circuit of FIG. 3 is described in connection with the timing diagram of FIG. 6 for the decoding of the byte 0-1-0-0-1-1-0-1. The circuit includes a clock 87 which produces pulses at the rate $R_1$ of approximately 128 cycles during each timing signal of the encoded data. The output from the clock 87 is applied to a gate 88 which by blocking every fifth cycle produces pulses at the rate $R_2$ which is 4/5 that of the clock 87. The output of the clock 87 is also applied to a "count-up" gate 90 while the lower-rate output from the gate 88 is applied to a "count-down" gate 91. Initially both gates 90 and 91 are disabled.

A pulse 92 (FIG. 6) on a line 93 clears a counter 94 causing the output of a gate 95 to go high at 95A in expectation of a data byte. When the first high-to-low transition 96 (FIG. 6) on an encoded data line 97 occurs, the output 98A from a gate 98 generates a data clock pulse 99 which clears three counters 101, 102 and 103. When these counters are cleared, a gate 105 goes high and enables the gates 90 and 91, and a serial data line 104 goes low at 106. Because the encoded data signal on the line 97 is low at this point, the gate 90 feeds pulses at the rate $R_1$ to the counters 101, 102 and 103 which count up until the next low-to-high level transition 107 of the encoded data signal. This disables the gate 90 and enables the gate 91 to apply pulses at the lower rate $R_2$ to cause the counters 101, 102 and 103 to count down until the next high-to-low transition 108 on the encoded data line 97. Because the transition 108 indicates a binary zero, it occurs before the counters reach zero. The serial data line 104 is low at 110 and the leading edge of a pulse 99A of the output 98A from the gate 98 will indicate when a binary bit has been decoded. Because the second bit is a binary one, the high-to-low transition 112 on the encoded data line 97 occurs after the counters go negative. The serial data line 104 will be high at 111 and the leading edge of the pulse 99B of the output 98A from the gate 98 will indicate that a binary bit has been decoded.

After the last bit 116 in the data byte is decoded, the counters 101, 102 and 103 will begin to count up on the high-to-low transition 118 and then start to count down on the next low-to-high transition 120. However, since no more bits are available to be decoded, the counters will continue to count down and when they reach a predetermined negative number (in this case, minus 128), the output 119 from a gate 121 will go high at 122 (FIG. 6) and then low to indicate that an 8-bit byte has been decoded. At this point the output of the gate 95 should be low at 124 if a complete set of pulses from the gate 98 (nine in this case) have been counted by the counter 94.

If another byte is to be decoded, the first transition of its first bit would occur at this time and the process described above would be repeated. However, if no more bytes are to be decoded, then the counters 101, 102 and 103 continue to count down until another predetermined negative count is reached (in this case, minus 512). When this count is reached, the output 125 from an inverter 110 goes high at 126 to indicate that the end of a block of bytes has occurred. Also, the output from the gate 105 goes low and disables the gates 90 and 91 so that no more counting takes place.

The circuit of FIG. 5 has been successfully operated with the following components:

|  | Integrated Circuit TTL Logic No. |
|---|---|
| Gates 88, 98, 121, 144 | 7408 |
| Gates 90, 91, 140 | 7410 |
| Counter 94 | 7493 |
| Counters 101, 102, 103, 142 | 74193 |
| Gates 95, 105 | 7400 |
| Inverters 110, 133, 134, 135, 136, 137 | 7404 |
| Gate 128 | 7430 |
| Flip-flops 130, 131 | 74107 |

The present invention is especially adaptable for use with the belt-driven tape cartridge disclosed in U.S. Pat. No. 3,692,255 (von Behren). The tape of that cartridge can be started and stopped very quickly and can be moved at very high speeds in either direction. However, it is subject to variations in head-to-tape speed with which the present invention can readily cope. Typically, when equipped with ¼-inch tape, there may be four tracks, each independently recorded with data in the practice of this invention.

I claim:
1. Method of encoding binary numbers on a recording medium comprising the steps of:
   1. generating alternate timing and data signals of first and second voltage levels, respectively, wherein each timing signal has a fixed time duration $t$ and the data signals have variable time durations $x$, a first binary number is designated by $x = at$, a second binary number is designated by $x = abt$, and the absence of binary information is designated by $x > abct$, where $a$ is a predetermined small number and each of $b$ and $c$ is a predetermined number appreciably exceeding one, and
   2. serially recording the alternate timing and data signals along a track of the medium.
2. Method as defined in claim 1 wherein $a$ is ½ to 2, $b$ is 1.5 to 3, and $c$ is 1.25 to 3.
3. Method as defined in claim 2 wherein $a$ is about 1, $b$ is about 2, and $c$ is about 1.5.
4. Method as defined in claim 1 wherein step (1) further comprises generating (i) a predetermined number of consecutive timing and data signals of $at$ and $abt$ durations to represent a byte of binary information, (ii) a timing signal followed by a data signal exceeding $abct$ duration to represent an inter-byte gap, and (iii) a timing signal followed by a data signal exceeding $abcdt$ duration to represent the end of a message consisting of a series of bytes, where $d$ is a predetermined number appreciably exceeding 1.
5. Method as defined in claim 4 wherein $a$ is ½ to 2, $b$ is 1.5 to 3, $c$ is 1.25 to 5, and $d$ is 2 to 8.
6. Method of encoding and decoding binary numbers on a recording medium comprising the steps of:

1. generating alternate timing and data signals of first and second voltage levels, respectively, wherein each timing signal has a fixed time duration $t$ and the data signals have variable time durations $x$, a first binary number is designated by $x = at$, a second binary number is designated by $x = abt$ and the absence of binary information is designated by $x > abct$, where $a$ is a predetermined small number and each of $b$ and $c$ is a predetermined number appreciably exceeding one,
2. serially recording the alternate timing and data signals along a track of the medium,
3. playing back the recorded signals,
4. measuring the time interval $t'$ of a played-back timing signal at a rate $R_1$,
5. measuring the time interval $x'$ of the succeeding played-back data signal at a rate $R_2 = rR_1$, and
6. subtracting the $x'$ measurement in step (5) from the $t'$ measurement in step (4) and producing an output signal indicative of the first binary number when the difference is greater than a first quantity $t = rn$ where $n$ is a value intermediate $at$ and $abt$,
   indicative of the second binary number when the difference is less than said first quantity and is greater than a second quantity $t - r(abct)$,
   indicative of the absence of binary information when the difference is less than said second quantity.

7. Method as defined in claim 6 wherein measuring step (4) involves counting up from zero during the interval $t'$, step (5) involves counting down during the interval $x'$ at a rate $R_2$ such that $r$ is less $t/a$ and greater than $t/ab$, and step (6) involves subtracting the count in step (5) from the count in step (4) and producing an output signal indicative of the first binary number when the countdown is positive,
   indicative of the second binary number when the countdown is negative while having an absolute magnitude less than a count-down equalling $r(abct)$.

8. Method as defined in claim 6 wherein step (1) involves generating (i) a predetermined number of consecutive timing and data signals to represent a byte of binary information, (ii) a timing signal followed by a data signal having a predetermined time duration exceeding $abct$ and less than $abcdt$ to represent an interbyte gap, $d$ being a predetermined number appreciably exceeding 1, and (iii) a timing signal followed by a data signal having a predetermined time duration exceeeding $abcdt$ to represent the end of a message consisting of a block of bytes, and step (6) involves producing an output signal indicative of an end-of-message gap when the difference is less than a third quantity $t - r(abcdt)$.

9. Method as defined in claim 8, including the additional steps of
   7. counting the bits in each byte, and
   8. producing an error signal when the count differs from said predetermined number.

10. Apparatus for encoding binary numbers on a recording medium comprising:
    1. means for generating alternate timing and data signals of first and second voltage levels, respectively, wherein each timing signal has a fixed time duration $t$ and the data signals have variable time durations $x$, a first binary number is designated by $x = at$, a second binary number is designated by $x = abt$ and the absence of binary information is designated by $x > abct$, where $a$ is a predetermined small number and each of $b$ and $c$ is a predetermined number appreciably exceeding one, and
    2. means for serially recording the alternate timing and data signals along a track.

11. Apparatus for encoding and decoding binary numbers on a recording medium comprising:
    1. means for generating alternate timing and data signals of first and second voltage levels, respectively, wherein each timing signal has a fixed time duration $t$ and the data signals have variable time durations $x$, a first binary number is designated by $x = at$, a second binary number is designated by $x - abt$ and the absence of binary information is designated by $x > abct$, where $a$ is a predetermined small number and each of $b$ and $c$ is a predetermined number appreciably exceeding one,
    2. means for serially recording the alternate timing and data signals along a track of the medium,
    3. means for playing back the recorded signals,
    4. means for measuring the time interval $t'$ of each played-back timing signal at a rate $R_1$,
    5. means for measuring the time interval $x'$ of each played-back data signal at a rate $R_2 = rR_1$, and
    6. means for subtracting the output of the $x'$ measuring means (5) from the output of the $t'$ measuring means (4) and for producing an output signal indicative of the first binary number when the difference is greater than a first quantity $t - rn$ where $n$ is a value intermediate $at$ and $abt$,
       indicative of the second binary number when the difference is less than said first quantity and is greater than a second quantity $t - r(abct)$,
       indicative of the absence of binary information when the difference is less than said second quantity.

12. Apparatus as defined in claim 11 wherein said $t'$ means means (4) includes means for counting up from zero during the interval $t'$, said $x'$ measuring means (5) includes means for counting down during the interval $x'$ at a rate $R_2$ such that $r$ is less than $t/a$ and greater than $t/ab$, and said subtracting means (6) includes means for producing an output signal indicative of the first binary number when the countdown is positive,
    indicative of the second binary number when the countdown is negative while having an absolute magnitude less than a count-down equalling $r(abct)$.

13. Apparatus as defined in claim 11 wherein generating means (1) includes means for generating (i) a predetermined number of consecutive timing and data signals to represent a byte of binary information, (ii) a timing signal followed by a data signal having a predetermined time duration exceeding $abct$ and less than $abcdt$ to represent an interbyte gap, $d$ being a predetermined number appreciably exceeding one, and (iii) a timing signal followed by a data signal exceeding $abcdt$ to represent the end of a message consisting of a block of bytes, and subtracting means (6) includes means for producing an output signal indicative of an end-of-message gap when the difference is less than a third quantity $t - r(abcdt)$.

14. Apparatus as defined in claim 13 further including
    7. means for counting the bits in each byte, and
    8. means for producing an error signal when the count differs from said predetermined number.

15. Apparatus as defined in claim 11 for use with magnetic recording tape wherein the generating means (1) and the playing back means (3) are magnetic recording means.

* * * * *